United States Patent
Yoshimura

(10) Patent No.: US 8,033,271 B2
(45) Date of Patent: Oct. 11, 2011

(54) DIAGNOSTIC DEVICE AND DIAGNOSTIC METHOD FOR FUEL VAPOR TREATMENT SYSTEM OF VEHICLE

(75) Inventor: Seiji Yoshimura, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 114 days.

(21) Appl. No.: 12/433,963

(22) Filed: May 1, 2009

(65) Prior Publication Data
US 2009/0277427 A1    Nov. 12, 2009

(30) Foreign Application Priority Data
May 8, 2008  (JP) ................................ 2008-121992

(51) Int. Cl.
*F02M 33/02*   (2006.01)
*F02M 25/08*   (2006.01)

(52) U.S. Cl. ..................................... 123/520; 73/114.39
(58) Field of Classification Search .................. 123/516, 123/518, 519, 520; 73/114.39
See application file for complete search history.

(56) References Cited

U.S. PATENT DOCUMENTS

| | | | | |
|---|---|---|---|---|
| 5,499,614 | A * | 3/1996 | Busato et al. ................. | 123/520 |
| 5,635,630 | A * | 6/1997 | Dawson et al. ............. | 73/40.5 R |
| 5,685,279 | A * | 11/1997 | Blomquist et al. ............ | 123/520 |
| 6,041,648 | A * | 3/2000 | Angermaier et al. ....... | 73/114.39 |
| 6,269,803 | B1 * | 8/2001 | Corkill .......................... | 123/520 |
| 6,453,881 | B1 * | 9/2002 | Gras .............................. | 123/509 |
| 6,964,193 | B2 * | 11/2005 | Kobayashi et al. ......... | 73/114.39 |
| 7,036,354 | B2 * | 5/2006 | Itakura et al. ..................... | 73/40 |
| 7,036,359 | B2 * | 5/2006 | Hayakawa et al. ......... | 73/114.39 |
| 7,363,803 | B2 * | 4/2008 | Hayakawa et al. ........... | 123/499 |
| 2001/0004844 | A1 * | 6/2001 | Yamaki ....................... | 73/40.5 R |
| 2009/0266147 | A1 * | 10/2009 | Maegawa ....................... | 73/40.7 |

FOREIGN PATENT DOCUMENTS

| | | |
|---|---|---|
| JP | 5052153 | 3/1993 |
| JP | 5254352 | 10/1993 |
| JP | 2002180916 | 6/2002 |
| JP | 2004278314 | 10/2004 |
| JP | 2007120473 | 5/2007 |

* cited by examiner

*Primary Examiner* — Thomas N Moulis
(74) *Attorney, Agent, or Firm* — Gifford, Krass, Sprinkle, Anderson & Citkowski, P.C.

(57) ABSTRACT

A diagnostic device for a fuel vapor treatment system having: a canister that captures fuel vapor generated in a fuel tank; a purge passage for purging fuel vapor from the canister to an intake passage of an internal combustion engine; a purge valve provided in the purge passage to adjust a flow rate of fuel vapor; a processing device that depressurize an fuel vapor path extending from the fuel tank to the purge valve via the canister by a pump and performs a diagnostic processing for diagnosing a leak of fuel vapor from the fuel vapor path based on a change in pressure in the fuel vapor path during depressurization; and an angle detection device that detects an angle of inclination of the vehicle. The processing device determines, based on an inclination angle of the vehicle detected by the angle detection device, whether the diagnostic processing can be performed.

17 Claims, 12 Drawing Sheets

FIG. 11

|  | 0 ← PITCH ANGLE P → LARGE | | | | | |
|---|---|---|---|---|---|---|
| SMALL | OFF | OFF | OFF | OFF | OFF | ON |
| ↑ | OFF | OFF | OFF | OFF | ON | ON |
| REMAINING FUEL AMOUNT | OFF | OFF | OFF | OFF | ON | ON |
| | OFF | OFF | OFF | ON | ON | ON |
| | OFF | OFF | OFF | ON | ON | ON |
| ↓ | OFF | OFF | ON | ON | ON | ON |
| LARGE | OFF | OFF | ON | ON | ON | ON |

FIG. 12

|  | 0 ← ROLL ANGLE R → LARGE | | | | | |
|---|---|---|---|---|---|---|
| SMALL | OFF | OFF | OFF | OFF | OFF | ON |
| ↑ | OFF | OFF | OFF | OFF | ON | ON |
| REMAINING FUEL AMOUNT | OFF | OFF | OFF | OFF | ON | ON |
| | OFF | OFF | OFF | ON | ON | ON |
| | OFF | OFF | OFF | ON | ON | ON |
| ↓ | OFF | OFF | ON | ON | ON | ON |
| LARGE | OFF | OFF | ON | ON | ON | ON |

DIAGNOSTIC DEVICE AND DIAGNOSTIC METHOD FOR FUEL VAPOR TREATMENT SYSTEM OF VEHICLE

INCORPORATION BY REFERENCE

The disclosure of Japanese Patent Application No. 2008-121992 filed on May 8, 2008 including the specification, drawings and abstract is incorporated herein by reference in its entirety.

BACKGROUND OF THE INVENTION

1. Field of the Invention

The invention relates to a diagnostic device and method for a fuel vapor treatment system provided in an internal combustion engine of a vehicle.

2. Description of the Related Art

In order to restrain the discharge of fuel vapor generated in a fuel tank into the atmosphere, an internal combustion engine mounted in a vehicle is provided with a fuel vapor treatment system that captures the fuel vapor in a canister. The fuel vapor treatment system is composed of a canister for capturing fuel vapor generated in the fuel tank, a purge passage for purging fuel vapor removed from the canister to an intake passage of the internal combustion engine, and a purge valve provided in the purge passage to adjust a flow rate of fuel vapor. In this fuel vapor treatment system, there is a limit to the amount of fuel vapor that may be retained by the canister. Therefore, a so-called purge treatment is carried out. That is the purge valve is opened to remove fuel vapor from the canister during the operation of the engine, and the removed fuel vapor is introduced into the intake passage via the purge passage to be burned in a combustion chamber By executing the purge treatment, the fuel vapor adsorption performance of the canister is recovered.

In the fuel vapor treatment system, when a hole is formed or a sealing failure occurs in a fuel vapor path that extends from the fuel tank to the purge valve via the canister, fuel vapor leaks into the atmosphere. As a result, the fuel vapor treatment system cannot sufficiently perform its intended function.

Thus, various devices for diagnosing the leak of fuel vapor from the fuel vapor path are proposed. For example, in the device described in Japanese Patent Application Publication No. 2002-180916 (JP-A-2002-180916), a pressure in an fuel vapor path is increased by a pump, and the leak of fuel vapor is diagnosed based on a diagnostic parameter that changes depending on whether fuel vapor leaks at the time of pressurization. Further, in the device, to restrain fuel from leaking through a feed oil port as a result of the increase in the surface of oil in a fuel tank when the pressure in the fuel vapor path is increased, permission to execute the leak diagnostic is determined based on the angle of inclination of the vehicle.

If the leak diagnostic as described in Japanese Patent Application Publication No. 2002-180916 (JP-A-2002-180916) is carried out when fuel vapor actually leaks from the fuel vapor path, the occurrence of a leak is detected based on the described diagnostic parameteL However, because the pressure in the fuel vapor path is increased while the leak diagnostic is carried out, there is a possibility that a larger amount of fuel vapor may be discharged into the atmosphere through the leak.

Thus, when the pump is used not to increase but to reduce the pressure in the fuel vapor path in carrying out the leak diagnostic, the pressure in the fuel vapor path is below a pressure outside the fuel vapor path, namely, the atmospheric pressure. Therefore, fuel vapor leaks from the fuel vapor path during the leak diagnostic may be reduced.

However, if the pressure in the fuel vapor path is reduced using the pump as described above, then when the vehicle is inclined during the leak diagnostic, liquid fuel in the fuel tank may be drawn in by the pump and delivered into the canister or the pump itself. If liquid fuel is thus drawn into the canister, the capture performance of the canister, which is provided to adsorb fuel vapor, deteriorates, and liquid fuel may be introduced into the intake passage due to the purge treatment in some cases. Further, the pump for pressure reduction is also intrinsically designed to draw in gaseous fuel. Therefore, if liquid fuel flows into the pump, a deterioration in the performance thereof or a malfunction thereof may be caused.

It is also conceivable to form the fuel tank and the like in such a shape that liquid fuel may be restrained from being drawn in by the pump. In this case, however, there is a limit to the angle of inclination of a vehicle that can be coped with. It is difficult to cope with an excessively large angle of inclination.

SUMMARY OF THE INVENTION

The invention provides a diagnostic device and a diagnostic method for an fuel vapor treatment system of a vehicle that can suppresses the delivery of liquid fuel by a pump, which may occur when the vehicle is inclined, to reduce the pressure in an fuel vapor path when executing a fuel vapor leak diagnostic.

A first aspect of the invention relates to a diagnostic device for an fuel vapor treatment system of a vehicle including a canister that captures fuel vapor generated in a fuel tank, a purge passage for purging fuel vapor removed from the canister to an intake passage of an internal combustion engine, a purge valve provided in the purge passage to adjust a flow rate of fuel vapor, a processing device that reduces a pressure in an fuel vapor path extending from the fuel tank to the purge valve via the canister by means of a pump and performs a diagnostic processing for diagnosing a leak of fuel vapor from the fuel vapor path on passed on a change in pressure in the fuel vapor path during reduction of the pressure, and an angle detection device that detects an angle of inclination of the vehicle. The processing device determines, based on the angle of inclination of the vehicle, detected by the angle detection device, whether the diagnostic may be executed.

According to the foregoing aspect of the invention, the pressure in the fuel vapor path is reduced when the diagnostic of the leak of fuel vapor from the fuel vapor path is carried out. Therefore, the pressure in the fuel vapor path when executing the leak diagnostic is below the pressure outside the fuel vapor path, namely, the atmospheric pressure. Therefore, if the leak diagnostic is executed when fuel vapor actually leaks from the fuel vapor path, the leak of fuel vapor from the fuel vapor path when the diagnostic is executed may be prevented.

Further, it is determined, based on the angle of inclination of the vehicle, whether the fuel vapor leak diagnostic may be executed. Thus, when the likelihood that liquid fuel in the fuel tank may be drawn in by pressure reduction pump due to the inclination of the vehicle, it is also possible to prohibit execution of the fuel vapor leak diagnostic. Consequently, according to this construction, the suction of liquid fuel by the pump, which may occur when the vehicle is inclined operation of the fuel pump to reduce the pressure in the fuel vapor path when the fuel vapor leak diagnostic is executed, is suspended.

A second aspect of the invention relates to a method of diagnosing a leak of fuel vapor in an fuel vapor treatment system composed of a canister that captures fuel vapor generated in a fuel tank, a purge passage for purging fuel vapor removed from the canister to an intake passage of an internal combustion engine, and a purge valve provided in the purge passage to adjust a flow rate of fuel vapor. The diagnosis method includes reducing a pressure in an fuel vapor path extending from the fuel tank to the purge valve via the canister by means of a pump, diagnosing a leak of fuel vapor from the fuel vapor path on based on a change in pressure in the fuel vapor path during reduction of the pressure, and determining, based on an angle of inclination of a vehicle, whether a processing of the diagnosis can be performed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 11 is a conceptual view of a pitch angle determination map in the second embodiment of the invention;

FIG. 12 is a conceptual view of a roll angle determination map in the second embodiment of the invention.

DETAILED DESCRIPTION OF EMBODIMENTS

The first embodiment of a diagnostic device for a fuel vapor treatment system according to the invention will be described hereinafter with reference to FIGS. 1 to 9.

Figure 1:
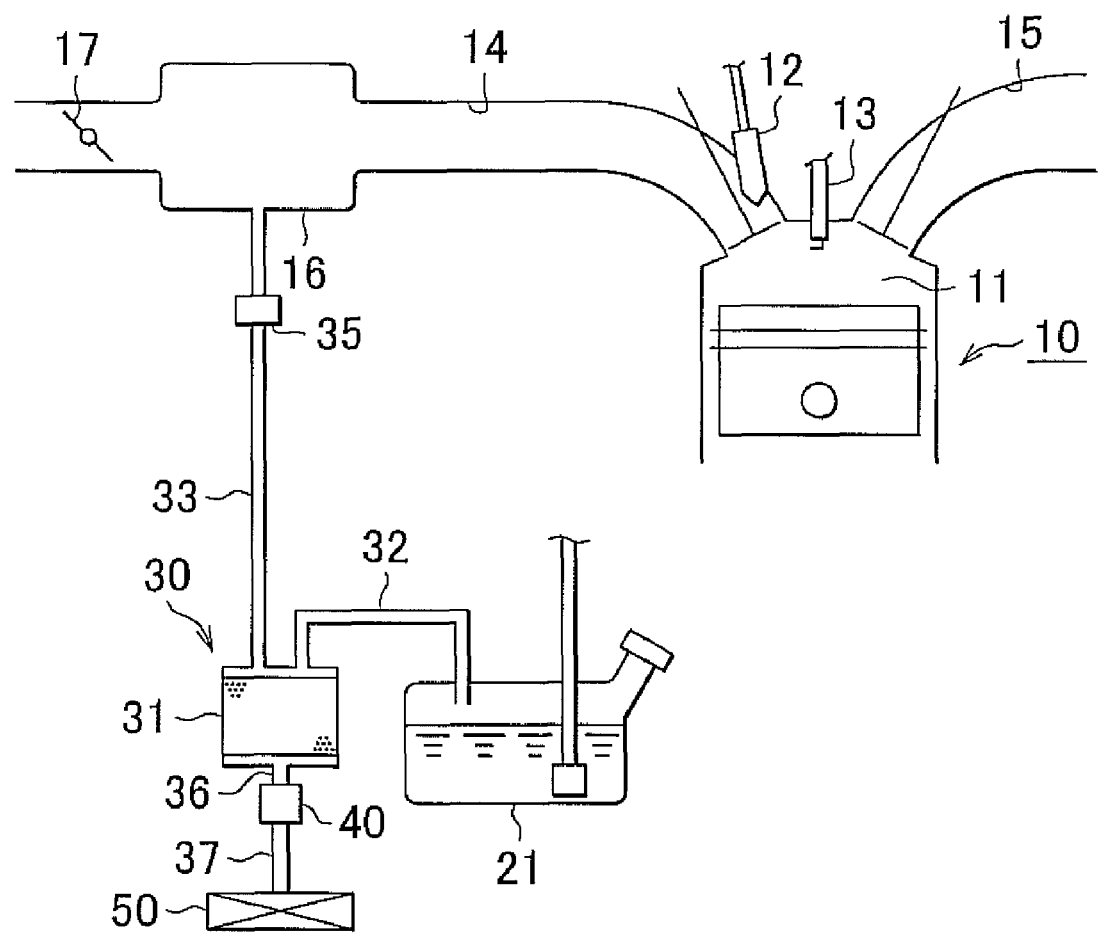
FIG. 1 is a schematic diagram showing the construction of an internal combustion engine to which a diagnosis device for an fuel vapor treatment system according to the first embodiment of the invention is applied.

FIG. 1 shows a schematic construction of an engine 10 equipped with a diagnostic device for an fuel vapor treatment system. As shown in FIG. 1, the engine 10 includes a fuel injection valve 12, and an ignition plug 13 for igniting a mixture of the injected fuel and intake air. Further, an intake passage 14 constituting part of an intake system and an exhaust passage 15 constituting part of an exhaust system are connected to the combustion chamber 11. A surge tank 16 is provided such that the intake passage 14 extends thereacross. In addition, a throttle valve 17 for adjusting the amount of intake air is provided upstream of the surge tank 16.

The engine 10 includes a fuel vapor treatment system 30 for restraining fuel vapor generated in the fuel tank 21 from being discharged to the atmosphere. The fuel vapor treatment system 30 is provided with a canister 31 that traps fuel vapor. The canister 31 is connected to the fuel tank 21 via a fuel vapor passage 32. The canister 31 and the surge tank 16 are connected to each other by a purge passage 33, and a purge valve 35 is provided such that the purge passage 33 extends thereacross. An air introduction port of the canister 31 and a later-described pump module 40 are connected to each other by an air introduction passage 36, and the pump module 40 and an air filter 50 are connected to each other by an atmosphere open passage 37.

Vapor generated in the fuel tank 21 is introduced from the fuel tank 21 into the canister 31 through a vapor passage 32, and is temporarily captured by an adsorbent provided in the canister 31. Further, the purge valve 35 is opened to introduce the atmosphere into the canister 31, and vapor adsorbed in the canister 31 is thereby introduced into the surge tank 16 through a purge passage 33. Vapor introduced into the intake system through this purge treatment is subjected to a combustion treatment in the combustion chamber 11 together with fuel injected from the fuel injection valve 12.

Figure 2:
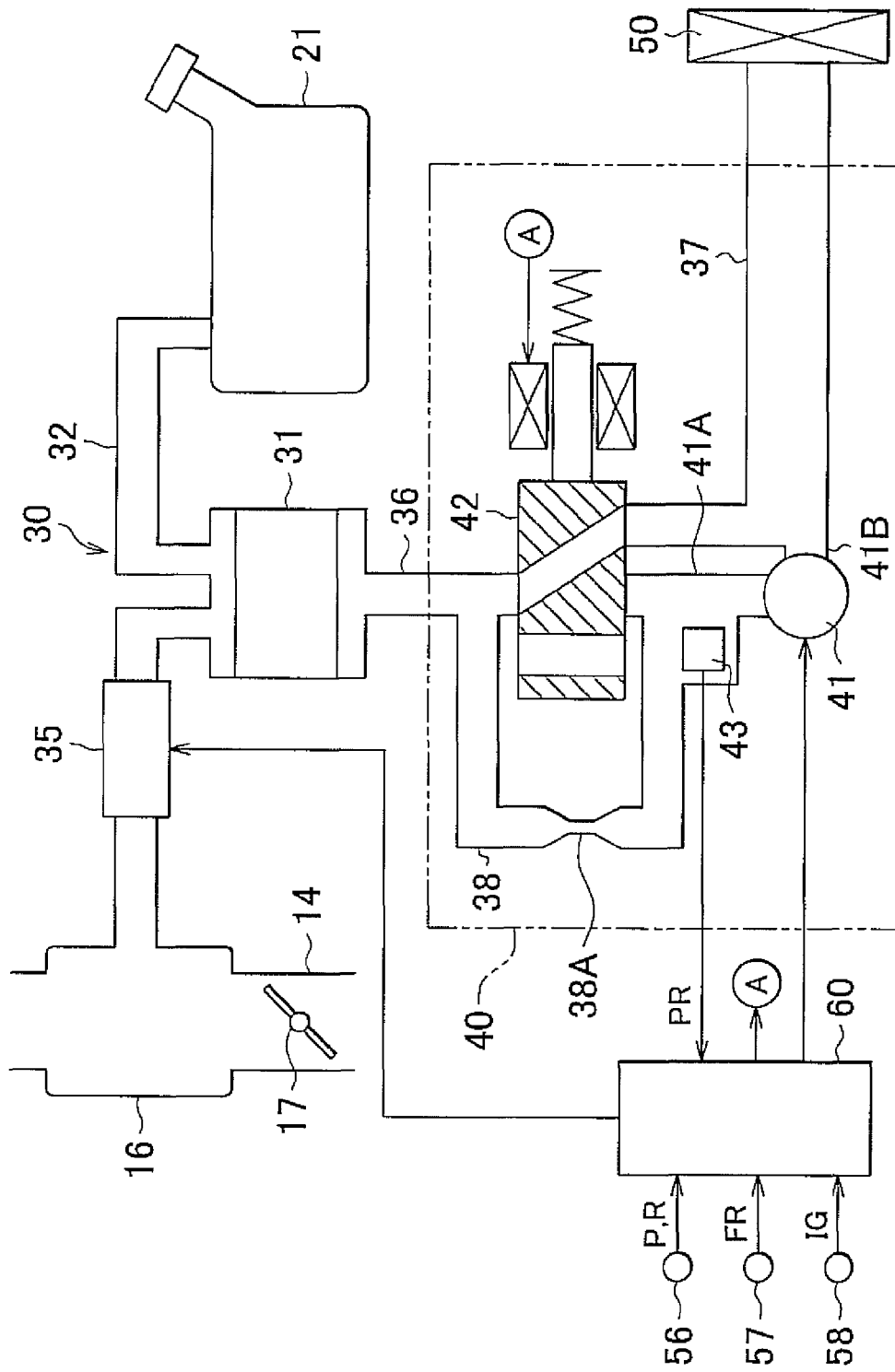
FIG. 2 is a schematic view showing the construction of a pump module in the first embodiment of the invention.

FIG. 2 schematically shows the structure of the pump module 40. As shown in this FIG. 2, the pump module 40 is provided with a vane-type electric air pump 41 (hereinafter referred to as the pump 41) for reducing the pressure in the fuel vapor treatment system 30 to make the internal pressure thereof lower than the atmospheric pressure, and the pump 41 is driven through a signal from a control device 60. Further, an electromagnetic changeover valve 42 for selectively connecting the fresh air introduction passage 36 connected to the canister 31 to the atmosphere open passage 37 connected to an air filter 50 or a suction port passage 41A of the pump 41 is provided. Further, a bypass passage 38 extending from the suction port passage 41A of the pump 41 to the fresh air introduction passage 36 without passing through the changeover valve 42 is provided. This bypass passage 38 is provided with an orifice 38A as a reference hole. A discharge port passage 41B of the pump 41 is connected to the atmosphere open passage 37. Further, the suction port passage 41A of the pump 41 is provided with a pressure sensor 43 for detecting a pressure in the fuel vapor treatment system 30 (hereinafter referred to as a system internal pressure) PR. The changeover valve 42 is normally off. The fresh air introduction passage 36 and the atmosphere open passage 37 communicate with each other when the changeover valve 42 is off. Further, the fresh air introduction passage 36 and the suction port passage 41A communicate with each other when the changeover valve 42 is on.

The control regarding the treatment of vapor is performed by the control device 60. This control device 60 is composed of a central processing unit (CPU), a read only memory (ROM), a random access memory (RAM), a backup RAM, an external input circuit, an external output circuit, and the like. Various sensors for detecting the operation of the engine 10 and the like, the pressure sensor 43, an inclination angle sensor 56 for detecting an angle of inclination of the vehicle, a fuel gauge 57 for detecting an amount FR of fuel remaining in the fuel tank 21, an ignition switch 58 operated by a driver of the vehicle, and the like are connected to the control device 60. Then, the control regarding the treatment of vapor, for example, the control of the opening degree of the purge valve 35 or the like is performed by the control device 60 based on signals from those sensors and the switch. In this embodiment of the invention, a gyro sensor is adopted as the inclination angle sensor 56. This sensor detects a pitch angle P of the vehicle (an angle of inclination of the vehicle with respect to a longitudinal direction thereof) and a roll angle R of the vehicle (an angle of inclination of the vehicle with respect to a lateral direction thereof).

Further, the control device 60 performs a diagnostic processing of determining whether vapor leaks from an fuel vapor path extending from the fuel tank 21 to the purge valve 35 via the canister 31. In this embodiment of the invention, in diagnosing such a leak, a diagnostic processing of determining whether there is an abnormality in the operation of each of members constituting the fuel vapor treatment system 30 is also performed.

Figure 3:
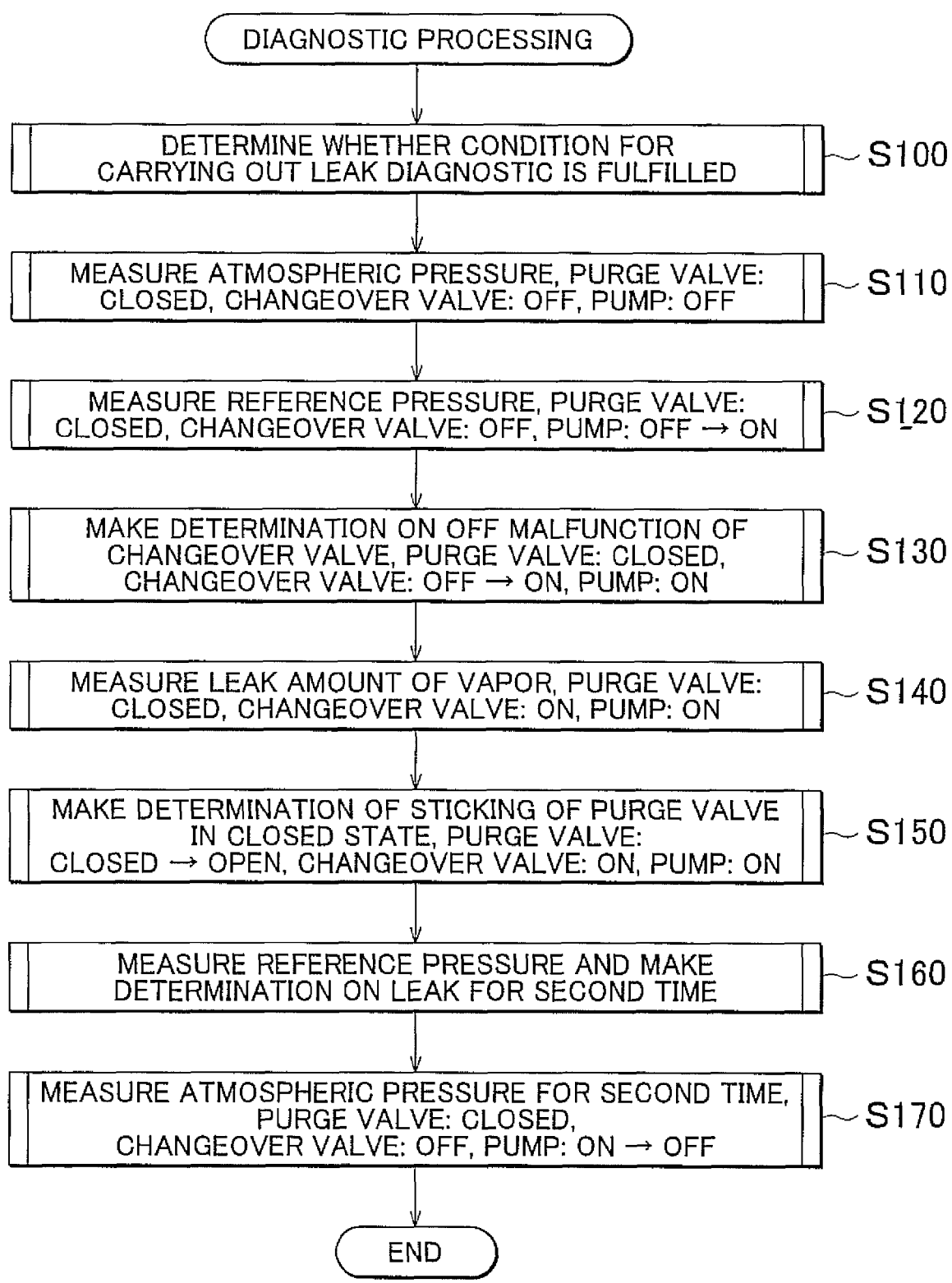
FIG. 3 is a flowchart showing a procedure of a diagnosis processing in the first embodiment of the invention.
Figure 4:
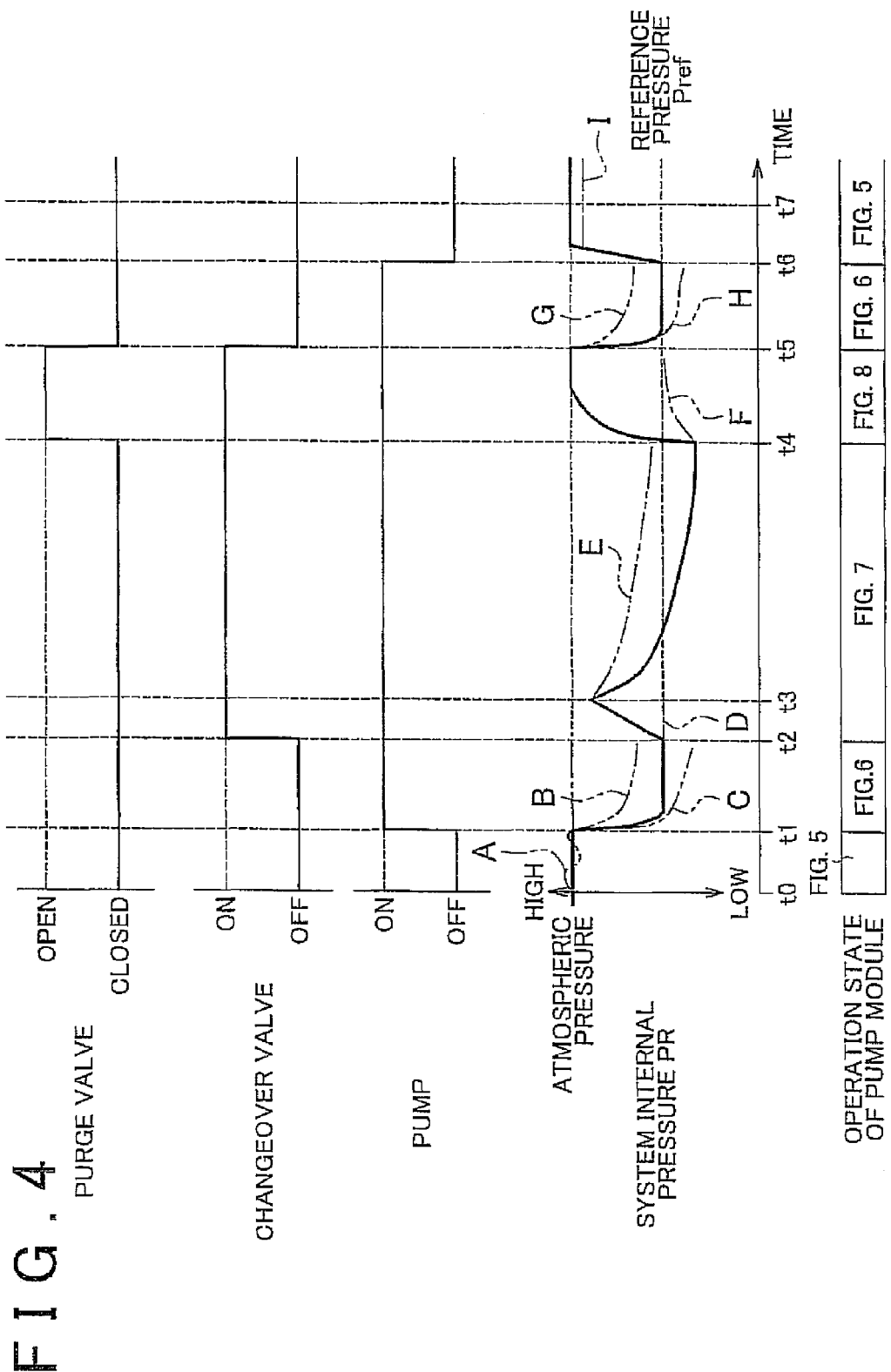
FIG. 4 is composed of timing charts showing how a purge valve, a changeover valve, and a pump operate during the performance of the diagnosis processing, and how the internal pressure of the system changes, respectively.

The diagnostic processing will be described hereinafter. FIG. 3 shows a procedure of the diagnostic processing. FIG. 4 shows changes in various parameters during the performance of the diagnostic processing. Further, FIGS. 5 to 8 show the operation of the pump module 40 during the performance of the diagnostic processing.

When the diagnostic processing shown in FIG. 3 is started, the control device 60 first determines whether a condition for carrying out a leak diagnostic is fulfilled (S100). In this case, it is determined that the condition for carrying out the leak diagnostic is fulfilled, for example, when all conditions (A) to (F) mentioned below are fulfilled. When the condition for carrying out the leak diagnostic is not fulfilled, the present processing is temporarily terminated.

Condition (A): that the ignition switch 58 be off. This condition is set to confirm that the leak diagnostic can be stably carried out without being influenced by the operation during stoppage of the engine 10.

Condition (B): that the battery voltage be equal to or higher than a predetermined value. This condition is set to confirm that an electric power required for the driving of the pump 41 is ensured even during stoppage of the engine.

Condition (C): that the temperatures of intake air and coolant be within predetermined ranges respectively. This condition is set to prevent the pump 41 from freezing and failing to operate.

Condition (D): that a time equal to or longer than a predetermined time has elapsed since stoppage of the engine 10. This condition is set to confirm that the temperature of fuel is sufficiently low and stable, because the accuracy in making a determination in the leak diagnostic may deteriorate due to a rise in the system internal pressure PR resulting from the generation of vapor when the temperature of fuel is high.

Condition (E): that a purge treatment be sufficiently carried out during the last operation of the engine. This condition is set to confirm whether the capture capacity of the canister 31 is recovered to such an extent that vapor can be sufficiently captured during the driving of the pump 41 as well, because vapor in the fuel tank 21 is absorbed/captured by the canister 31 during the driving of the pump 41.

Condition (F): that a pump operation permission flag PF for permitting the driving of the pump 41 be "ON". This condition is set to confirm whether the pump 41 is suited to be driven. The mode of setting the pump operation permission flag PF will be described later.

Figure 5:
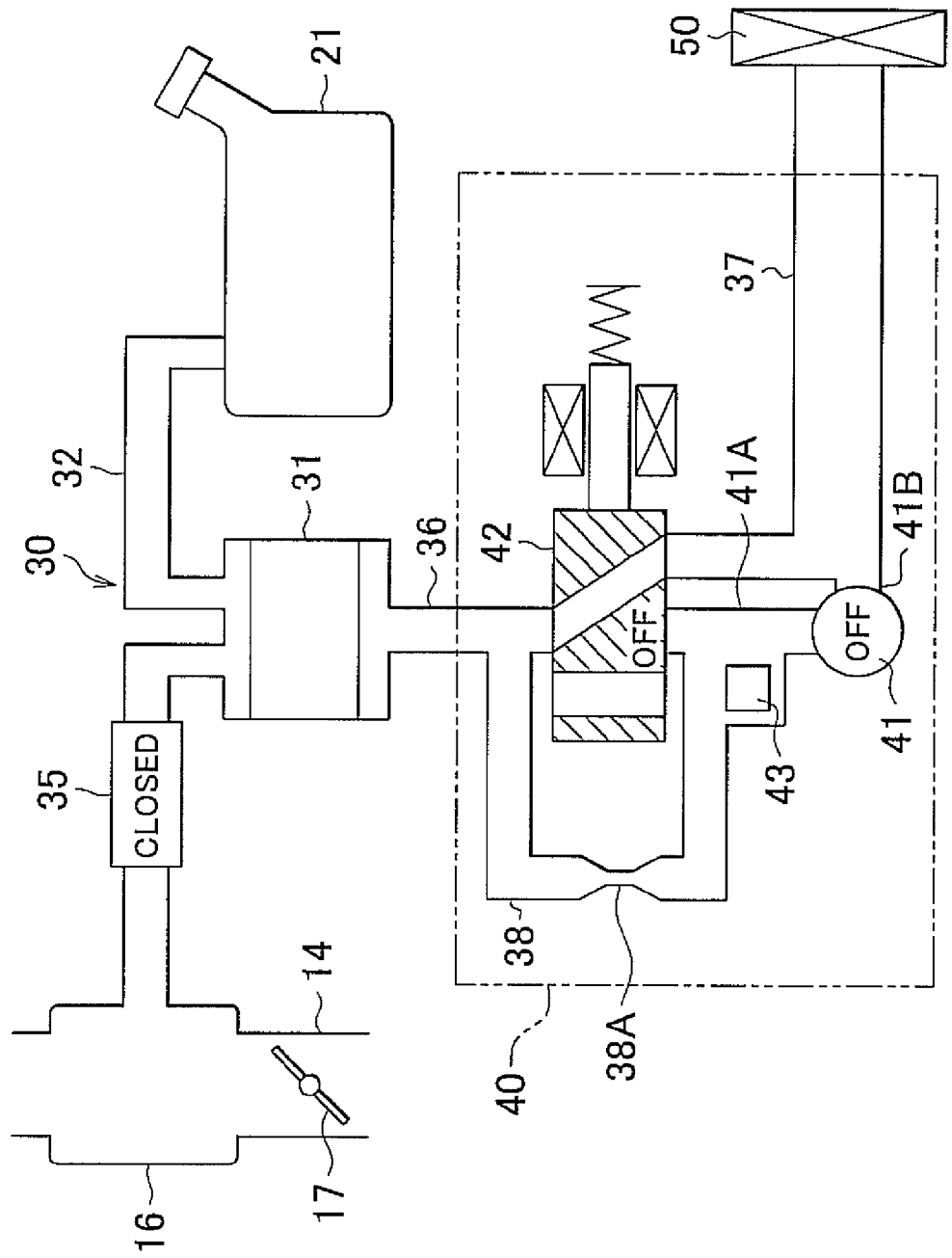
FIG. 5 is a schematic view showing the operation of the pump module during the performance of the diagnosis processing.

When all these conditions (A) to (F) are fulfilled, the leak diagnostic is carried out according to the following procedure. First of all, the control device 60 measures an atmospheric pressure (S110, from a time t0 to a time t1 in FIG. 4). In this case, as shown in FIG. 5, the purge valve 35 is closed, and both the changeover valve 42 and the pump 41 are turned off. Thus, the system internal pressure PR detected by the pressure sensor 43 becomes a pressure equivalent to the atmospheric pressure, and it is determined whether the detected value is stable. In the period of this measurement of the atmospheric pressure (from the time t0 to the time t1), when the system internal pressure PR is unstable or outside a predetermined range as indicated by a line A in FIG. 4, it is determined that there is an abnormality in the pressure sensor 43, and the diagnostic processing is terminated.

Figure 6:
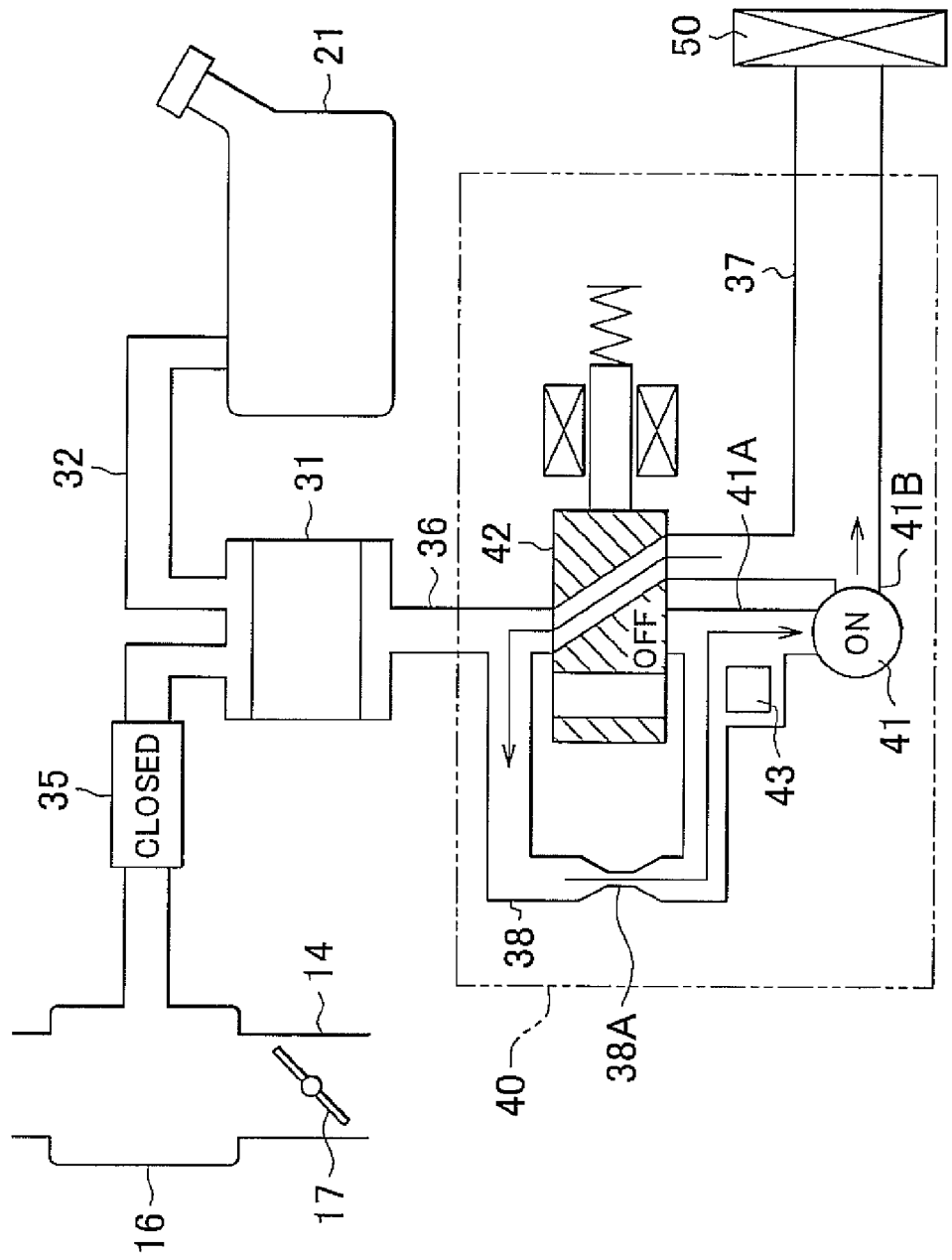
FIG. 6 is a schematic view showing the operation of the pump module during the performance of the diagnosis processing.

On the other hand, when the system internal pressure PR is stable and it is determined that there is no abnormality in the pressure sensor 43, the control device 60 then measures a reference pressure Pref (S120, from the time t1 to a time t2 in FIG. 4). In this case, as shown in FIG. 6, the purge valve 35 is held closed, the changeover valve 42 is turned off, and the pump 41 that has been held off is turned on. Thus, the pressure in the bypass passage 38 is reduced, the system internal pressure PR at the time of the occurrence of a leak corresponding to the reference hole is detected by the pressure sensor 43, and the detected value is stored as a reference pressure Pref. In the period of the measurement of this reference pressure (from the time t0 to the time t2), when the system internal pressure PR does not sufficiently decrease as indicated by a line B in FIG. 4, it is considered that there is an abnormality in the operation of the pump 41 or the changeover valve 42 or an inconvenience of the malfunction of the reference hole resulting from an increase in the diameter thereof. Thus, it is determined that there is an abnormality in the pump module 40, and the diagnostic processing is terminated. Further, in the period of the measurement of the reference pressure (from the time t1 to the time t2), when the system internal pressure PR excessively decreases as indicated by a line C in FIG. 4, it is considered that there is an inconvenience of the malfunction of the reference hole resulting from a decrease in the diameter thereof. Therefore, it is determined that there is an abnormality in the reference hole, and the diagnostic processing is terminated.

Figure 7:
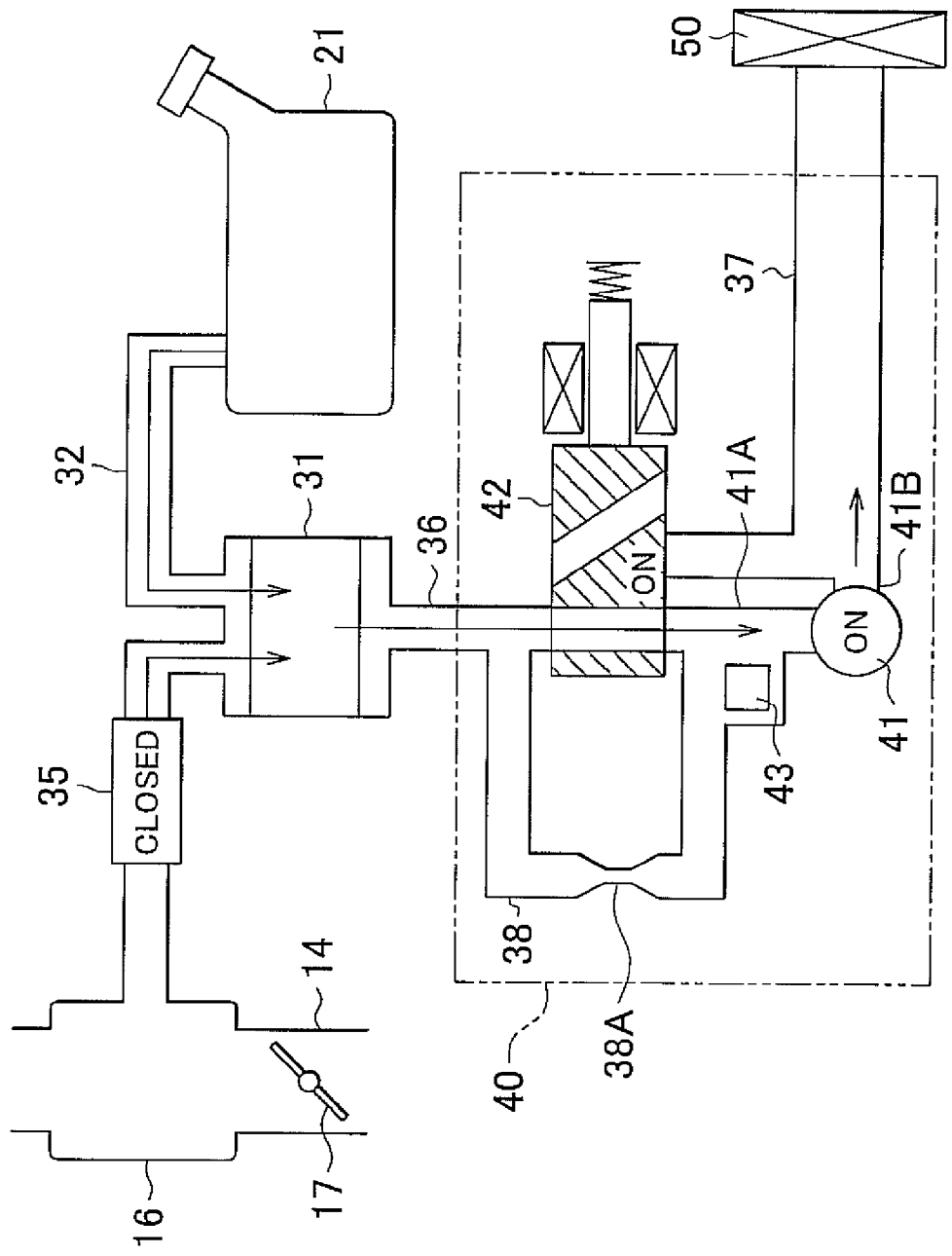
FIG. 7 is a schematic view showing the operation of the pump module during the performance of the diagnosis processing.
Figure 8:
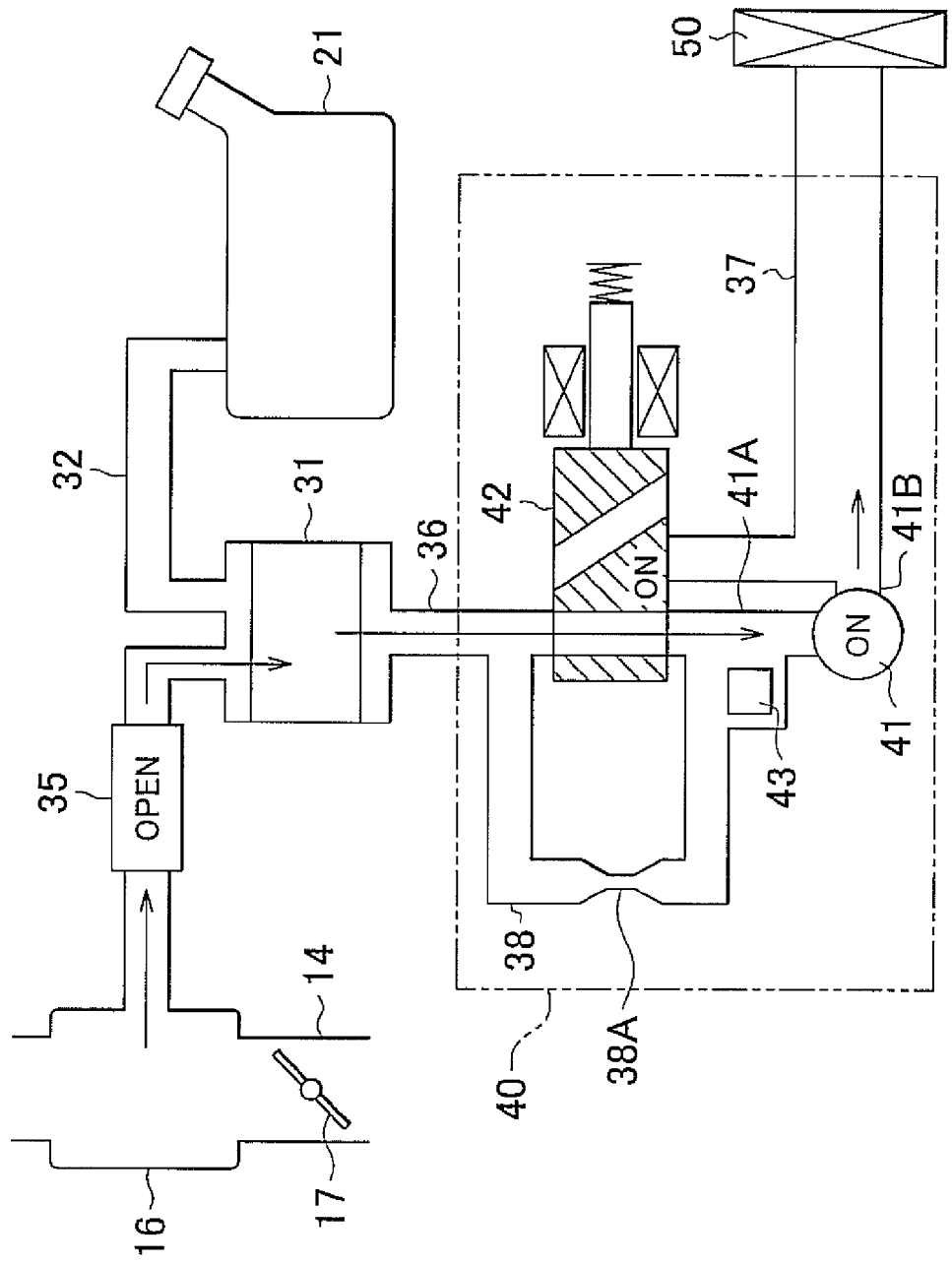
FIG. 8 is a schematic view showing the operation of the pump module during the performance of the diagnosis processing.

On the other hand, when it is determined in step S120 that the system internal pressure PR is within a predetermined range and there is no abnormality in the pump module 40 or the reference hole, the control device 60 then makes a determination on an off malfunction of the changeover valve 42 (S130, from the time t2 to a time t3 in FIG. 4). In this case, as shown in FIG. 7, the purge valve 35 is held closed, the changeover valve 42 that has been held off is turned on, and the pump 41 is held on. Thus, immediately after the changeover valve 42 that has been held off is turned on, the pressure in the canister, which is so far equivalent to the atmospheric pressure, is detected by the pressure sensor 43. Therefore, the system internal pressure PR temporarily rises to a pressure close to the atmospheric pressure. In the period of this determination on the off malfunction (from the time t2 to the time t3), when the system internal pressure PR does not rise as indicated by a line D in FIG. 4, it is considered that there is an inconvenience of the changeover valve 42 being held off despite the outputting of a signal for turning the changeover valve 42 on. Therefore, it is determined that there is an off malfunction in the changeover valve 42, and the diagnostic processing is terminated.

On the other hand, when it is determined in step S130 that the system internal pressure PR has risen to the pressure close to the atmospheric pressure and there is no off malfunction in the changeover valve 42, the control device 60 then measures a leak of vapor (S140, from the time t3 to a time t4 in FIG. 4).

In this case, as shown in FIG. 7, the purge valve 35 is held closed, and both the changeover valve 42 and the pump 41 are held on. Thus, both the changeover valve 42 and the pump 41 are held on, and the system internal pressure PR that has temporarily risen to the pressure close to the atmospheric pressure thereby decreases again and eventually falls to a value corresponding to the degree of air-tightness of the fuel vapor path. Then, the amount of change in the system internal pressure PR decreases, and the sufficiently stable system internal pressure PR is stored. In the period of this measurement of the leak (from the time t3 to the time t4), when there is a leak region larger than the reference hole in the fuel vapor path, the system internal pressure PR becomes higher than the reference pressure Pref as indicated by a line E in FIG. 4.

When the system internal pressure PR at the time when the pressure in the fuel vapor path is reduced is stored in step S140, the control device 60 then makes a determination on the sticking of the purge valve 35 in a closed state thereof (S150, from the time t4 to a time t5 in FIG. 4). In this case, as shown in FIG. S, the purge valve 35 that has been held closed is opened, and both the changeover valve 42 and the pump 41 are held on. Thus, when the purge valve 35 that has been held closed is opened, the internal pressure of the intake passage 14 equal to the pressure equivalent to the atmospheric pressure is detected by the pressure sensor 43. Therefore, the system internal pressure PR rises to a pressure close to the atmospheric pressure. In the period of this determination on the sticking in the closed state (from the time t4 to the time t5), when the system internal pressure PR does not sufficiently rise as indicated by a line F in FIG. 4, it is considered that there is an inconvenience of the purge valve 35 being held closed despite the outputting of a signal for opening the purge valve 35. Therefore, it is determined that there is an abnormality of the sticking in the purge valve 35 in the closed state thereof, and the diagnostic processing is terminated.

On the other hand, when it is determined in step S150 that the system internal pressure PR has sufficiently risen and there is no abnormality of the sticking in the purge valve 35 in the closed state thereof, the control device 60 then measures the reference pressure Pref and makes a determination on a leak for the second time (S160, from the time t5 to a time t6 in FIG. 4). In this case, as shown in FIG. 6 mentioned earlier, the purge valve 35 that has been held open is closed, the changeover valve 42 that has been held on is turned off, and the pump 41 is held on. Thus, as is the case with step S120 mentioned earlier, the pressure in the bypass passage 38 is reduced, the system internal pressure PR at the time corresponding to the occurrence of a leak equivalent to the reference hole is detected by the pressure sensor 43, and the detected value is set as the reference pressure Pref for the second time. In the period of this second measurement of the reference pressure (from the time t5 to the time t6), when the system internal pressure PR does not sufficiently decrease as indicated by a line G in FIG. 4 or when the system internal pressure PR excessively decreases as indicated by a line H in FIG. 4, it is determined that there is an abnormality in the pump 41, and the diagnostic processing is terminated.

On the other hand, when a difference between the reference pressure Pref measured for the second time and the reference pressure Pref measured for the first time in step S120 mentioned earlier is sufficiently small, it is determined that the reference pressure Pref is sufficiently accurate, and the reference pressure Pref measured for the second time is compared with the system internal pressure PR stored at the time of the measurement of the leak in step S140 mentioned earlier. Then, when the system internal pressure PR stored at the time of the measurement of the leak is lower than the reference pressure Pref measured for the second time, it is determined that there is no leak of vapor. When the system internal pressure PR stored at the time of the measurement of the leak is higher than the reference pressure Pref measured for the second time, it is determined that there is a leak of vapor.

The control device 60 then measures the atmospheric pressure for the second time (S170, from the time t6 to a time t7 in FIG. 4). In this case, as shown in FIG. 5 mentioned earlier, the purge valve 35 is held closed, the changeover valve 42 is also held off, and the pump 41 that has been held on is turned off. Thus, the system internal pressure PR detected by the pressure sensor 43 becomes a pressure equivalent to the atmospheric pressure. In the period of this second measurement of the atmospheric pressure (from the time t6 to the time t7), when a difference between the atmospheric pressure measured for the second time and the atmospheric pressure measured for the first time in step S110 mentioned earlier is equal to or larger than a predetermined value, the atmospheric pressure changes between step S110 and step S170, and the system internal pressure PR measured in the meantime is not very reliable. Therefore, the results of various determinations according to the foregoing mode are all rejected, and the present processing is terminated.

On the other hand, when the difference between the atmospheric pressure measured for the second time and the atmospheric pressure measured for the first time in step S110 mentioned earlier is smaller than the predetermined value, the atmospheric pressure is stable between step S110 and step S170, and the system internal pressure PR measured in the meantime is reliable. Therefore, the results of various determinations according to the foregoing mode are ascertained, and the present processing is terminated.

As described above, in this embodiment of the invention, the pressure in the fuel vapor path is reduced by the pump 41 in diagnosing a leak of vapor from the fuel vapor path or making a determination on an abnormality in each of the members constituting the fuel vapor treatment system 30. Thus, the pressure in the fuel vapor path during the leak diagnostic or the abnormality diagnostic is lower than the pressure outside the fuel vapor path, namely, the atmospheric pressure. Accordingly, even in the case where the leak diagnostic processing as described above is performed when vapor actually leaks from the fuel vapor path, vapor can be restrained from leaking from the fuel vapor path during the diagnostic.

In the case where the pressure in the fuel vapor path is reduced in performing the diagnostic processing, when the vehicle is inclined during the performance of the diagnostic processing, there is an apprehension that liquid fuel in the fuel tank 21 may be sucked in by the pump 41 for pressure reduction and flow into the canister 31 or the pump 41 itself. When liquid fuel thus flows into the canister 31, the capture performance of the canister 31 intrinsically provided to capture gaseous fuel deteriorates, or liquid fuel may be introduced into the intake passage 14 through the purge valve 35. Further, the pump 41 is also intrinsically designed as an air pump for sucking in gaseous fuel. Therefore, when liquid fuel flows into this pump, a deterioration in performance or a malfunction may be caused. For example, in the case where the pump 41 is a vane-type air pump, a vane enters and exits a groove provided in a rotary shaft. When liquid fuel enters the groove, the vane is hindered from entering or exiting the groove. As a result, the function as the pump deteriorates.

Thus, in this embodiment of the invention, it is determined based on the angle of inclination of the vehicle whether the fuel vapor leak diagnostic process, or the like, may be executed. More specifically, in step S100 in the diagnostic process, "the condition (F): that the pump operation permission flag PF for permitting the driving of the pump 41 be 'ON'" is set as one of the conditions for executing the leak diagnostic. The value of the pump operation permission flag PF is set based on the angle of inclination of the vehicle.

Figure 9:
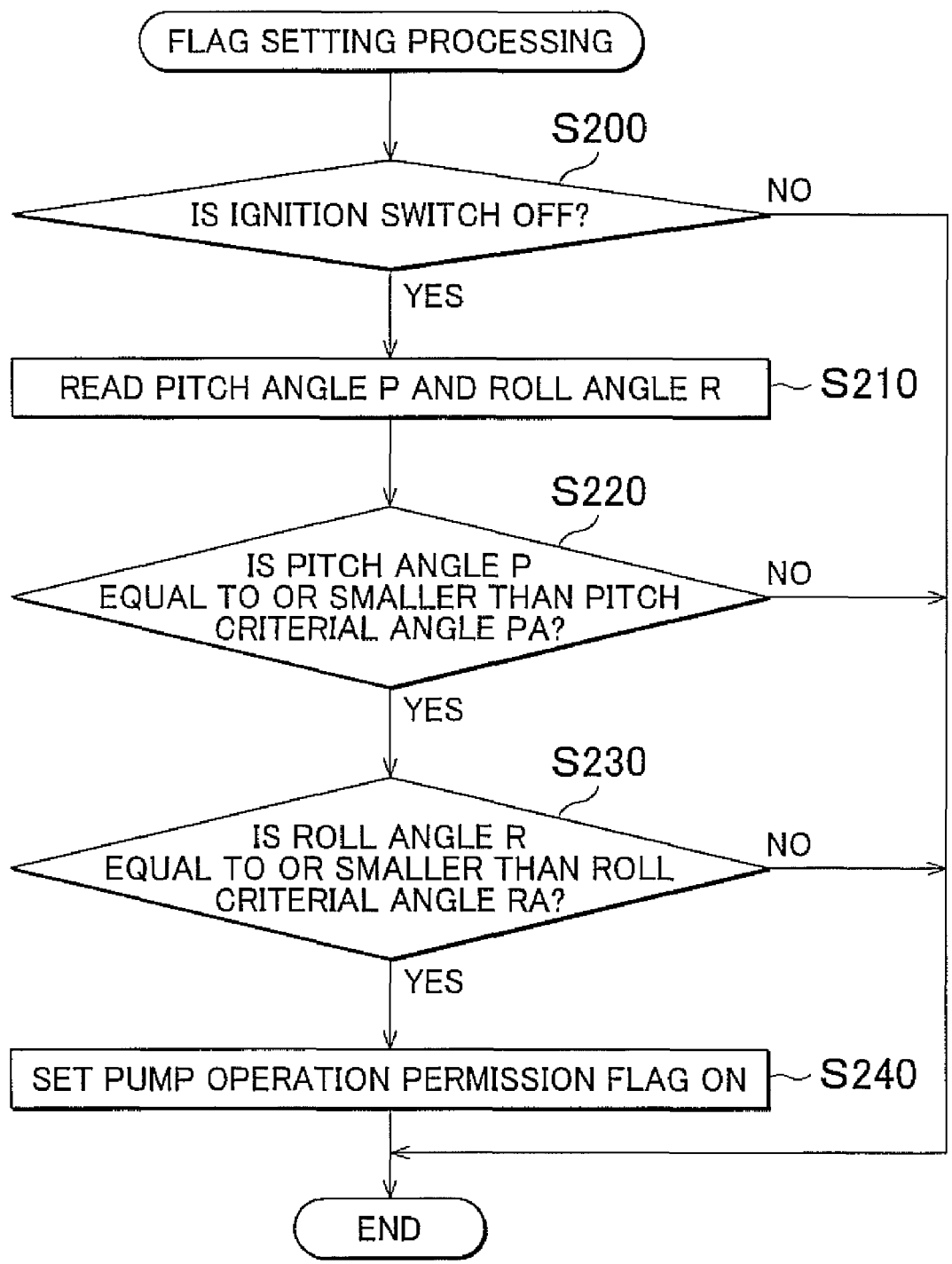
FIG. 9 is a flowchart showing a procedure of a processing of setting a pump operation permission flag in the first embodiment of the invention.

A flag setting process to change the value of the pump operation permission flag PF to "ON" will be described below. FIG. 9 shows the procedure of the flag setting process. The process is also executed by the control device 60.

When the present process is started, the control device 60 first determines whether the ignition switch 58 is off (S200). If the ignition switch 58 is on (S200: NO), the present process ends. However, if the ignition switch 58 is off (S200: YES), the control device 60 reads the pitch angle P and the roll angle R, detected by the inclination angle sensor 56 (S210).

The control device 60 then determines whether the pitch angle P is equal to or smaller than a preset pitch criterial angle PA (S220), and determines whether the roll angle R is equal to or smaller than a preset roll criterial angle RA (S230).

The pitch criterial angle PA and the roll criterial angle RA are set as constant values in view of the following. That is, the suction port of the vapor passage 32 connected to the fuel tank 21 needs to suck in gaseous fuel, and is therefore provided above the fuel tank 21. When the vehicle is inclined, the surface of oil in the fuel tank 21 approaches or reaches the suction port, and liquid fuel is thereby sucked in by the pump 41. As the amount of fuel remaining in the fuel tank 21 decreases, the angle of inclination at the time when the surface of oil approaches the suction port increases. As the amount of remaining fuel increases, the angle of inclination at the time when the surface of oil approaches the suction port decreases. Thus, in the case where the angle of inclination for permitting the diagnostic processing is made constant, a rather small angle of inclination needs to be set on the assumption that the fuel tank 21 is filled with a prescribed amount of fuel. Thus, a maximum pitch angle and a maximum roll angle that do not allow the surface of oil to reach the suction port of the vapor passage 32 are set as the pitch criterial angle PA and the roll criterial angle RA respectively in a state where the fuel tank 21 is filled with the prescribed amount of fuel.

Then, when the pitch angle P is larger than the pitch criterial angle PA (S220: NO) or when the roll angle R is larger than the roll criterial angle RA (S230: NO), it is determined that liquid fuel may be sucked in when the pump 41 is driven, and the present processing is temporarily terminated. In this case, the value of the pump operation permission flag PF is held "OFF" as the initial value. Therefore, in step S100 of the diagnostic processing, it is determined that the condition for carrying out the leak diagnostic is not fulfilled. Thus, the leak diagnostic is prohibited from being carried out.

On the other hand, when the pitch angle P is equal to or smaller than the pitch criterial angle PA (S220: YES) and the roll angle R is equal to or smaller than the roll criterial angle RA (S230: YES), no liquid fuel is sucked in even when the pump 41 is driven. Therefore, the pump operation permission flag PF is set "ON" (S240), and the present processing is temporarily terminated. In this case, the value of the pump operation permission flag PF is changed from "OFF" as the initial value to "ON". Therefore, in step S100 of the diagnostic processing, when the condition (F) regarding the possibility of driving the pump 41 is fulfilled and the other conditions (A) to (E) are fulfilled as well, the leak diagnostic is allowed to be carried out.

According to this embodiment of the invention described above, the following effects can be obtained.

The pressure in the fuel vapor path extending from the fuel tank 21 to the purge valve 35 via the canister 31 is reduced by the pump 41, and a leak of vapor from the fuel vapor path is diagnosed based on a change in the pressure in the fuel vapor path at the time of reduction of the pressure. Thus, even in the case where the vapor leak diagnostic is carried out when vapor actually leaks from the fuel vapor path, vapor can be restrained from leaking from the fuel vapor path during the diagnostic.

When the pitch angle P of the vehicle is larger than the pitch criterial angle PA or when the roll angle R is larger than the roll criterial angle RA, the value of the pump operation permission flag PF set as one of the conditions for performing the processing of the diagnostic of a vapor leak is held "OFF". The diagnostic processing is thereby prohibited from being performed. In this manner, it is determined based on the angle of inclination of the vehicle whether the processing of the diagnostic of a vapor leak can be performed. Therefore, when liquid fuel in the fuel tank 21 may be sucked in by the pump 41 for pressure reduction due to the inclination of the vehicle, the leak diagnostic can be prohibited from being carried out. Accordingly, the suction of liquid fuel by the pump 41, which may occur when the vehicle is inclined, can be suppressed.

Next, the second embodiment of the invention as materialization of the diagnostic device for the fuel vapor treatment system according to the invention will be described with reference to FIGS. 10 to 12.

In the first embodiment of the invention, the pitch criterial angle PA and the roll criterial angle RA are set to the maximum pitch angle and the maximum roll angle that do not allow the surface of oil to reach the suction port of the vapor passage 32 respectively when the fuel tank 21 is filled with a prescribed amount of fuel. In this case, rather small angles of inclination are set as the pitch criterial angle PA and the roll criterial angle RA on the assumption that the fuel tank 21 is filled with the prescribed amount of fuel. Accordingly, the leak diagnostic is allowed to be carried out only when the angle of inclination of the vehicle is rather small. As a result, there is an apprehension that the number of opportunities to carry out the diagnostic may decrease.

On the other hand, as the amount of remaining fuel decreases, the angle of inclination at the time when the surface of oil approaches the suction port of the vapor passage 32 increases. Therefore, as the amount of fuel remaining in the fuel tank 21 decreases, the angle of inclination for prohibiting the diagnostic processing from being performed can be increased as well. Thus, in this embodiment of the invention, as the amount of fuel remaining in the fuel tank 21 decreases, the angle of inclination of the vehicle for prohibiting the diagnostic processing from being performed is increased. By thus making variable the angle of inclination for permitting the performance of the leak diagnostic processing, the number of opportunities to carry out the diagnostic processing is increased in comparison with a case where the angle of inclination for permitting the performance of the diagnostic processing is constant as in the first embodiment of the invention.

Figure 10:
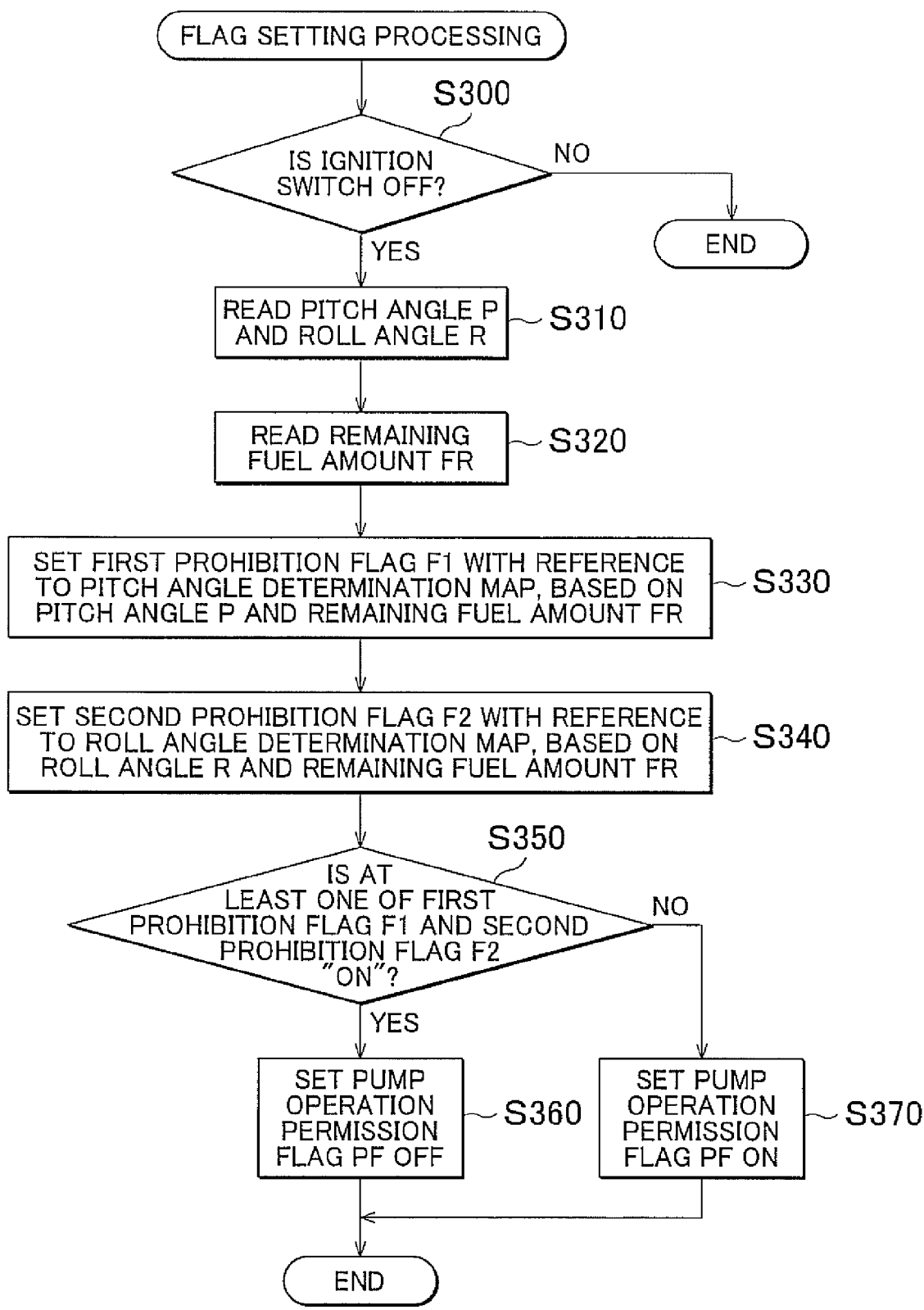
FIG. 10 is a flowchart showing a procedure of a processing of setting a pump operation permission flag in the second embodiment of the invention.

FIG. 10 shows a procedure of the flag setting processing for setting the pump operation permission flag PF in this embodiment of the invention. This processing is also performed by the control device 60. When this processing is started, the control device 60 first determines whether the ignition switch 58 is off (S300). When the ignition switch 58 is on (S300: NO), the present processing is temporarily terminated. On the other hand, when the ignition switch 58 is off (S300: YES), the pitch angle P and the roll angle R, which have been detected by the inclination angle sensor 56, are read as angles of inclination of the vehicle in a stopped state thereof (S310).

The control device 60 then reads an amount FR of fuel remaining in the fuel tank 21 (S320). The control device 60 then sets a first prohibition flag F1 with reference to a pitch angle determination map stored in the ROM, based on the pitch angle P and the amount FR of remaining fuel (S330). This first prohibition flag F1 is a flag indicating whether the diagnostic processing can be performed, and is set "ON" when the diagnostic processing is prohibited from being performed, and "OFF" when the diagnostic processing is allowed to be performed. Further, as shown in FIG. 11, the pitch angle determination map is designed such that the pitch angle P at which the value of the first prohibition flag F1 is set "ON" increases as the amount FR of remaining fuel decreases. Owing to this design of the map, as the amount FR of remaining fuel decreases, the range of the pitch angle P at which the value of the first prohibition flag F1 is set "OFF", namely, the range of the pitch angle P at which the performance of the diagnostic processing is permitted widens, and the number of opportunities to perform the diagnostic processing is increased.

The control device 60 then sets the second prohibition flag F2 with reference to a roll angle determination map stored in the ROM, based on the roll angle R and the amount FR of remaining fuel (S340). This second prohibition flag F2 is also a flag indicating whether the diagnostic processing can be performed, and is set "ON" when the diagnostic processing is prohibited from being performed, and "OFF" when the diagnostic processing is allowed to be performed. Further, as shown in FIG. 12, the roll angle determination map is designed such that the roll angle R at which the value of the second prohibition flag F2 is set "ON" increases as the amount FR of remaining fuel decreases. Owing to this design of the map, as the amount FR of remaining fuel decreases, the range of the roll angle R at which the value of the second prohibition flag F2 is set "OFF", namely, the range of the roll angle R at which the diagnostic processing is allowed to be performed widens, and the number of opportunities to perform the diagnostic processing is increased.

The control device 60 then determines whether at least one of the first prohibition flag F1 and the second prohibition flag F2 is set "ON" (S350). If the result of the determination is affirmative (S350: YES), liquid fuel may be drawn in upon the driving of the pump 41. Therefore, the pump operation permission flag PF is set "OFF" (S360), and the present process ends. In this case, it is determined in step S100 of the diagnostic process that the condition for executing the leak diagnostic is not satisfied, and execution of the leak diagnostic is prohibited.

However, if both the first prohibition flag F1 and the second prohibition flag F2 are set "OFF" (S350: NO), no liquid fuel is drawn in upon the driving of the pump 41. Therefore, the pump operation permission flag PF is set "ON" (S370), and the present process ends. Therefore, in step S100 of the diagnostic process, if the condition (F) regarding the possibility of driving the pump 41 is satisfied and the other conditions (A) to (E) are satisfied as well, execution of the leak diagnostic is allowed.

According to the embodiment of the invention described above, in addition to the effects of the first embodiment of the invention, the following effects are also obtained.

The angle of inclination of the vehicle at which the execution of the diagnostic process is prohibited is set to increase as the amount FR of fuel remaining in the fuel tank 21 decreases. By thus making the angle of inclination at which execution of the vapor leak diagnostic is allowed variable, the number of opportunities to execute the diagnostic process is increased in comparison with the case where the angle of inclination at which execution of the diagnostic process is allowed remains constant.

The pitch angle determination map for setting, based on the pitch angle P, the value of the first prohibition flag F1 which indicates whether execution of the diagnostic process is permitted, is provided. The pitch angle determination map is set such that the pitch angle P at which the value of the first prohibition flag F1 is set "ON" to prohibit execution of the diagnostic process increases as the amount FR of remaining fuel decreases. Accordingly, as the amount FR of remaining fuel decreases, the range of the pitch angle P at which the diagnostic process may be executed widens, and the number of opportunities to execute the diagnostic process may be increased.

The roll angle determination map for setting, based on the roll angle R, the value of the second prohibition flag F2 indicating whether the diagnostic process may be executed, as in the case of the first prohibition flag F1 indicating whether the diagnostic process may be executed, is provided. The roll angle determination map is set such that the roll angle R at which the value of the second prohibition flag F2 is set "ON" to prohibit execution of the diagnostic process increases as the amount FR of remaining fuel decreases. Accordingly, as the amount FR of remaining fuel decreases, the range of the roll angle R at which execution of the diagnostic process is allowed widens, and the number of opportunities to execute the diagnostic process may be increased.

The foregoing respective embodiments of the invention can also be implemented after being modified as follows.

Figure 13:
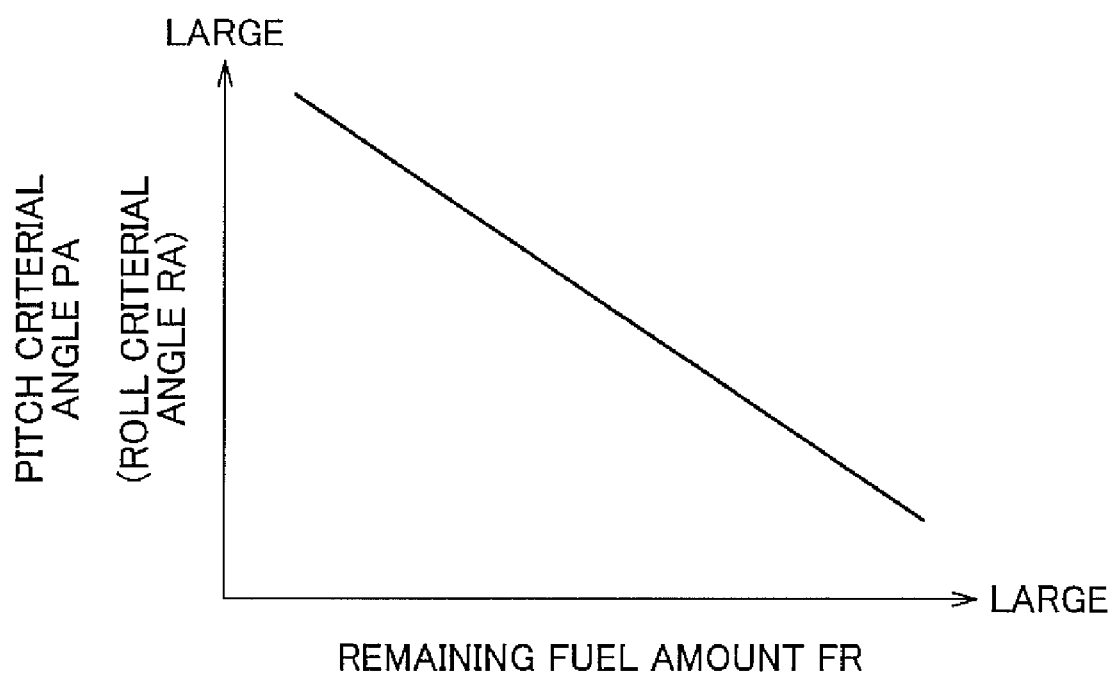
FIG. 13 is a graph showing how a remaining fuel amount, a pitch angle criterial value, and a roll angle criterial value correspond to one another in a modification example of the first embodiment of the invention.

In the first embodiment of the invention, the pitch criterial angle PA and the roll criterial angle RA are made constant. Besides, as in the second embodiment of the invention, the criterial values such as the pitch criterial angle PA and the roll criterial angle RA may be variably set such that the angle of inclination of the vehicle at which the diagnostic processing is prohibited from being performed increases as the amount FR of fuel remaining in the fuel tank 21 decreases. In this case, as shown in FIG. 13, the pitch criterial angle PA and the roll criteria angle RA are variably set so as to decrease as the amount FR of remaining fuel increases, conversely, so as to increase as the amount FR of remaining fuel decreases. Thus, the range of the angle of inclination at which the diagnostic processing is allowed to be performed widens, and the operation and effect similar to those of the second embodiment of the invention can thereby be obtained.

In the first embodiment of the invention, it is determined through the setting of the pump operation permission flag PF based on the angle of inclination of the vehicle whether the diagnostic processing can be performed. However, it may be determined directly based on the angle of inclination of the vehicle whether the diagnostic processing can be performed. For example, the condition (F) subjected to the determination in step S100 shown in FIG. 3 mentioned earlier is omitted. Then, when the pitch angle P is larger than the pitch criterial angle PA (S220 in FIG. 9: NO) or when the roll angle R is larger than the roll criterial angle RA (S230 in FIG. 9: NO), a series of procedures regarding the diagnostic processing shown in FIG. 3 are prohibited from being carried out. On the other hand, when the pitch angle P is equal to or smaller than the pitch criterial angle PA (S220 in FIG. 9: YES) and when the roll angle R is equal to or smaller than the roll criterial angle RA (S230 in FIG. 9: YES), a series of procedures regarding the diagnostic processing shown in FIG. 3 may be allowed to be carried out.

In the second embodiment of the invention, the value of the pump operation permission flag PF is changed based on the set values of the first prohibition flag F1 and the second prohibition flag F2, and it is determined in accordance with the set value of the pump operation permission flag PF whether the diagnostic processing can be performed. However, it may be determined directly based on the set values of the first prohibition flag F1 and the second prohibition flag F2 whether the diagnostic processing can be performed. In the modified example, it is acceptable to determine whether the diagnostic processing can be performed in such a manner as to allow the diagnostic processing to be performed when both the first prohibition flag F1 and the second prohibition flag F2 are set "OFF", and to prohibit the diagnostic processing from being performed when at least one of the first prohibition flag F1 and the second prohibition flag F2 is set "ON".

In the diagnostic process shown in FIG. 3, it is determined whether vapor leaks from the fuel vapor path extending from the fuel tank 21 to the purge valve 35 via the canister 31, and it is also determined whether there is an abnormality in each of the members constituting the fuel vapor treatment system 30. However, it is acceptable to perform only the process of determining whether vapor leaks.

In the first embodiment of the invention and the second embodiment of the invention, the pitch angle P and the roll angle R are detected as the angles of inclination of the vehicle for determining whether the diagnostic process may be executed. However, it is also appropriate only to detect the pitch angle P and determine whether the diagnostic processing may be executed based only on the detected pitch angle P. Alternatively, it is also appropriate only to detect the roll angle R and determine whether the diagnostic process may be executed based only on the roll angle R.

The control device 60 determines whether the vehicle is stopped by determining whether the ignition switch 58 is off. However, other parameters may also be used as long as it can be determined whether the vehicle is stopped. For example, the control device 60 may detect the speed of the vehicle by a speed sensor of the vehicle, and determine that the vehicle is stopped if the speed of the vehicle is equal to or below a predetermined value. In this case, the control device 60 needs to execute a control for suspending execution of the diagnostic process in response to the start of the movement of the vehicle.

The gyro sensor is used as the inclination angle sensor 56. However, other sensors may also be used as long as the angle of inclination of the vehicle can be detected. Further, in a vehicle equipped with a car navigation system capable of determining the angle of inclination of the vehicle, information on the angle of inclination from the car navigation system may be utilized.

In the invention, the processing device may increase the angle of inclination for prohibiting execution of the diagnostic process as the amount of fuel remaining in the fuel tank decreases.

The suction port for fuel vapor, with which the fuel tank is provided, needs to draw in fuel vapor, and hence is provided above the fuel tank. If the vehicle is inclined, the surface of liquid fuel in the fuel tank may reach the suction port, and liquid fuel is thereby drawn in by the pump. In this case, the angle of inclination when the surface of liquid fuel approaches the suction port increases as the amount of fuel remaining in the fuel tank decreases, and the angle of inclination at which the surface of liquid approaches the suction port decreases as the amount of remaining fuel increases. Thus, if the angle of inclination for permitting execution of the fuel vapor leak diagnostic remains constant, a rather small angle of inclination is set on the assumption that the fuel tank is filled with a prescribed amount of fuel. Accordingly, in this case, execution of the fuel vapor leak diagnostic may be executed only when the angle of inclination of the vehicle is rather small, and there is an apprehension that the number of times the diagnostic is carried out may decrease.

However, as the amount of remaining fuel decreases, the angle of inclination when the surface of the fuel approaches the suction port increases. Therefore, it is also possible to increase the angle of inclination at which the execution of the diagnostic process is prohibited, as the amount of fuel remaining in the fuel tank decreases. Thus, in the invention, as the amount of fuel remaining in the fuel tank decreases, the angle of inclination of the vehicle at which execution of the fuel vapor leak diagnostic is prohibited is increased. By thus making the angle of inclination at which execution of the fuel vapor leak diagnostic is prohibited variable, the number of opportunities to execute the diagnostic process may be increased in comparison with a case where the angle of inclination at which execution of the diagnostic is permitted remains constant.

In the invention, the processing device may compare the angle of inclination with a preset threshold value, and prohibit the execution of the diagnostic process when the angle of inclination is exceeds the threshold value. In the invention, the threshold value may be variably set to increase as the amount of remaining fuel decreases.

According to the invention, as the amount of remaining fuel decreases, the threshold value for prohibiting execution of the diagnostic process is increased. Accordingly, as the amount of remaining fuel decreases, the range of the angle of inclination over which the execution of the diagnostic process in increased, and the number of opportunities to execute the diagnostic process is thereby increased.

In the invention, the processing device may be equipped with a map for setting the value of the flag, which indicates whether the diagnostic process may be executed, based on the angle of inclination. The map may be set such that the angle of inclination at which the value of the flag for prohibiting execution of the diagnostic process increases as the amount of remaining fuel decreases.

According to the invention, as the amount of fuel remaining in the fuel tank decreases, the angle of inclination at which the value of the flag for prohibiting execution of the diagnostic process increases. Accordingly, in this case as well, as the amount of remaining fuel decreases, the range of the angle of inclination over which the execution of the diagnostic process is allowed is increased. Due to this configuration as well, the number of opportunities to execute the diagnostic process may be increased.

In the invention, the angle of inclination detected by the angle detection device may be one or more of the pitch angle and the roll angle of the vehicle.

While the invention has been described with reference to the example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A diagnostic device for a fuel vapor treatment system of a vehicle comprising:

a canister that captures fuel vapor generated in a fuel tank;

a purge passage for purging fuel vapor removed from the canister to an intake passage of an internal combustion engine;
a purge valve provided in the purge passage to adjust a flow rate of fuel vapor;
a processing device that reduces a pressure in a fuel vapor path extending from the fuel tank to the purge valve via the canister by means of a pump and performs a diagnostic processing for diagnosing a leak of fuel vapor from the fuel vapor path based on a change in pressure in the fuel vapor path during reduction of the pressure; and
an angle detection device that detects an angle of inclination of the vehicle,
wherein the processing device determines, based on an angle of inclination of the vehicle detected by the angle detection device, whether the diagnostic processing can be performed.

2. The diagnostic device according to claim 1, wherein:
the processing device compares the angle of inclination with a preset criterial value, and prohibits the diagnostic processing from being performed when the angle of inclination is larger than the criterial value; and
the criteria value is variably set so as to increase as the amount of remaining fuel decreases.

3. The diagnostic device according to claim 1, wherein the angle detection device detects at least one of a pitch angle of the vehicle and a roll angle of the vehicle as the angle of inclination.

4. The diagnostic device according to claim 3, wherein the angle detection device detects the pitch angle of the vehicle and the roll angle of the vehicle as the angle of inclination.

5. The diagnostic device according to claim 2, wherein the angle detection device detects at least one of a pitch angle of the vehicle and a roll angle of the vehicle as the angle of inclination.

6. The diagnostic device according to claim 5, wherein the angle detection device detects the pitch angle of the vehicle and the roll angle of the vehicle as the angle of inclination.

7. The diagnostic device according to claim 1, wherein:
the processing device compares the angle of inclination with a preset criterial value, and prohibits the diagnostic processing from being performed when the angle of inclination is larger than the criterial value; and
the criterial value is set to a maximum pitch angle or a maximum roll angle at which a surface of oil does not reach a suction port of the pump when the fuel tank is filled with fuel.

8. A method of diagnosing a leak of fuel vapor in an fuel vapor treatment system composed of a canister that captures fuel vapor generated in a fuel tank, a purge passage for purging fuel vapor removed from the canister to an intake passage of an internal combustion engine, and a purge valve provided in the purge passage to adjust a flow rate of fuel vapor, comprising:
reducing a pressure in an fuel vapor path extending from the fuel tank to the purge valve via the canister by means of a pump;
diagnosing a leak of fuel vapor from the fuel vapor path based on a change in pressure in the fuel vapor path during reduction of the pressure; and
determining, based on an angle of inclination of a vehicle, whether a processing of the diagnostic can be performed.

9. A diagnostic device for a fuel vapor system of a vehicle comprising:
a canister that captures fuel vapor generated in a fuel tank;
a purge passage for purging fuel vapor removed from the canister to an intake passage of an internal combustion engine;
a purge valve provided in the purge passage to adjust a flow rate of fuel vapor;
a processing device that reduces a pressure in a fuel vapor path extending from the fuel tank to the purge valve via the canister by means of a pump and performs a diagnostic processing for diagnosing a leak of fuel vapor from the fuel vapor path based on a change in pressure in the fuel vapor path during reduction of the pressure; and
an angle detection device that detects an angle of inclination of the vehicle,
wherein the processing device determines, based on an angle of inclination of the vehicle detected by the angle detection device, whether the diagnostic processing can be performed, and wherein the processing device increases the angle of inclination at which the diagnostic processing is prohibited from being performed as an amount of fuel remaining in the fuel tank decreases.

10. The diagnostic device according to claim 9, wherein:
the processing device compares the angle of inclination with a preset criterial value, and prohibits the diagnostic processing from being performed when the angle of inclination is larger than the criterial value; and
the criterial value is variably set so as to increase as the amount of remaining fuel decreases.

11. The diagnostic device according to claim 9, wherein:
the processing device is equipped with a map for setting, based on the angle of inclination, a value of a flag indicating whether the diagnostic processing can be performed; and
the map is set such that the angle of inclination at which a value of the flag for prohibiting the diagnostic processing from being performed is set increases as the amount of remaining fuel decreases.

12. The diagnostic device according to claim 9, wherein the angle detection device detects at least one of a pitch angle of the vehicle and a roll angle of the vehicle as the angle of inclination.

13. The diagnostic device according to claim 12, wherein the angle detection device detects the pitch angle of the vehicle and the roll angle of the vehicle as the angle of inclination.

14. The diagnostic device according to claim 10, wherein the angle detection device detects at least of a pitch angle of the vehicle and a roll angle of the vehicle as the angle of inclination.

15. The diagnostic device according to claim 14, wherein the angle detection device detects the pitch angle of the vehicle and the roll angle of the vehicle as the angle of inclination.

16. The diagnostic device according to claim 11, wherein the angle detection device detects at least one of a pitch angle of the vehicle and a roll angle of the vehicle as the angle of inclination.

17. The diagnostic device according to claim 16, wherein the angle detection device detects the pitch angle of the vehicle and the roll angle of the vehicle each as the angle of inclination.

* * * * *

UNITED STATES PATENT AND TRADEMARK OFFICE
CERTIFICATE OF CORRECTION

| | | |
|---|---|---|
| PATENT NO. | : 8,033,271 B2 | Page 1 of 1 |
| APPLICATION NO. | : 12/433963 | |
| DATED | : October 11, 2011 | |
| INVENTOR(S) | : Seiji Yoshimura | |

It is certified that error appears in the above-identified patent and that said Letters Patent is hereby corrected as shown below:

In the Specification:

At column 7, line number 20, After FIG. Delete "S" Insert -- 8 --

In the Claims:

At column 15, claim number 2, line number 24, Delete "criteria" Insert -- criterial --

Signed and Sealed this
Nineteenth Day of February, 2013

Teresa Stanek Rea
*Acting Director of the United States Patent and Trademark Office*